(12) United States Patent
Trice et al.

(10) Patent No.: US 7,445,409 B2
(45) Date of Patent: *Nov. 4, 2008

(54) CUTTING TOOL ASSEMBLY INCLUDING DIAMOND CUTTING TIPS AT HALF-PITCH SPACING FOR LAND FEATURE CREATION

(75) Inventors: Jennifer L. Trice, Hugo, MN (US); Charles N. Devore, Hugo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 199 days.

This patent is subject to a terminal disclaimer.

(21) Appl. No.: 11/253,782

(22) Filed: Oct. 19, 2005

(65) Prior Publication Data

US 2007/0084316 A1    Apr. 19, 2007

(51) Int. Cl.
*B23B 27/20* (2006.01)
*B23D 1/00* (2006.01)

(52) U.S. Cl. .................. 407/119; 407/113; 29/557

(58) Field of Classification Search ............... 82/1.11; 29/527.3; 359/530; 409/131; 58/294; 407/119
See application file for complete search history.

(56) References Cited

U.S. PATENT DOCUMENTS

| | | | | |
|---|---|---|---|---|
| 3,813,970 | A | * | 6/1974 | Mitchell ............... 82/158 |
| 3,893,356 | A | * | 7/1975 | Atzberger ............. 82/158 |
| 4,113,266 | A | | 9/1978 | Alexandrovich |
| 4,113,267 | A | | 9/1978 | Wittenberg |
| 4,294,586 | A | | 10/1981 | Cox, Jr. |
| 4,318,648 | A | | 3/1982 | Deprez et al. |
| 5,316,416 | A | | 5/1994 | Kim |
| 5,325,746 | A | | 7/1994 | Ehrenberg |
| 5,663,802 | A | | 9/1997 | Beckett et al. |
| 6,325,575 | B1 | | 12/2001 | Pawlik |
| 6,474,204 | B1 | | 11/2002 | Suzuki et al. |
| 6,599,178 | B1 | | 7/2003 | Gluche et al. |
| 6,755,598 | B2 | | 6/2004 | Rowland et al. |
| 7,140,812 | B2 | * | 11/2006 | Bryan et al. ............ 407/119 |
| 2003/0223830 | A1 | | 12/2003 | Bryan et al. |
| 2004/0045419 | A1 | | 3/2004 | Bryan et al. |

FOREIGN PATENT DOCUMENTS

| | | |
|---|---|---|
| EP | 0 830 946 B1 | 3/1998 |
| JP | 2002-307210 | 10/2002 |
| JP | 2004-042188 | 2/2004 |

* cited by examiner

*Primary Examiner*—Willmon Fridie
(74) *Attorney, Agent, or Firm*—Lance Vietzke

(57) ABSTRACT

The invention is directed to a cutting tool assembly that include multiple diamonds to define multiple cutting tips. A first diamond is positioned in the cutting tool assembly to create a first groove in a microreplication tool and a second diamond is positioned in the cutting tool assembly to create a second groove the microreplication tool, wherein the first and second grooves define integer pitch spacing of a microreplication structure to be created using the microreplication tool. In addition, a third diamond is positioned in the cutting tool assembly between the first and second diamonds to create a land feature in the microreplication tool between the first and second grooves. The invention can improve land feature creation by using a third diamond tip, rather than leaving the land features untooled and defined by the original untooled surface of micro-replication tool.

22 Claims, 13 Drawing Sheets

CUTTING TOOL ASSEMBLY INCLUDING DIAMOND CUTTING TIPS AT HALF-PITCH SPACING FOR LAND FEATURE CREATION

FIELD

The invention relates to diamond machining of work pieces such as microreplication tools that are used to fabricate microreplicated structures.

BACKGROUND

Diamond machining techniques can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

Microreplication tools include casting belts, casting rollers, injection molds, extrusion or embossing tools, and the like. Microreplication tools can be created by a diamond machining process in which a cutting tool assembly is used to cut grooves or other features into the microreplication tool. The process of creating a microreplication tool using a cutting tool assembly can be costly and time consuming.

SUMMARY

In general, the invention is directed to cutting tool assemblies that include multiple diamonds to define multiple cutting tips. The cutting tool assemblies having multiple diamonds can be used in creating microreplication tools or other work pieces. In accordance with the invention, at least two diamonds are precisely positioned in the cutting tool assembly, one for cutting a groove and one for cutting a land feature. In some cases, three diamonds are precisely positioned in the cutting tool assembly, e.g., with a land feature being cut between two groove features.

For example, cutting tips of the diamonds can be used to form grooves in a microreplication tool, and land features are defined between the grooves in the microreplication tool. A first diamond is positioned in the cutting tool assembly to create a first groove in the microreplication tool and a second diamond is positioned in the cutting tool assembly to create a second groove the microreplication tool. The first and second grooves define integer pitch spacing of a microreplication structure to be created using the microreplication tool. In addition, a third diamond is positioned in the cutting tool assembly between the first and second diamonds to create a land feature in the microreplication tool between the first and second grooves. In this sense, a cutting tip of the third diamond is positioned at integer pitch spacing plus one-half pitch spacing with respect to cutting tips of the first and second diamonds.

The cutting tool assembly may include a mounting structure and multiple tool shanks mounted in the mounting structure. Each of the tool shanks can define a diamond tip used as a cutting tip of the cutting tool assembly. At least two of the diamond cutting tips of the tool shanks can be precisely formed and positioned to correspond to grooves to be created in the microreplication tool. At least one of the diamond cutting tips of the tool shanks may be precisely formed and positioned to correspond to a land feature to be created in the microreplication tool between the grooves.

Using microscopic alignment, the first and second tool shanks can be precisely positioned in the mounting structure such that cutting locations of the tips of the first and second diamonds define one pitch spacing relative to one another. Accordingly, the first and second diamond tips of the cutting tool assembly may correspond to different grooves to be created in the microreplication tool with integer pitch spacings defined by the cutting locations of the diamond tips. The third tool shank can be precisely positioned in the mounting structure using microscopic alignment such that the cutting location of the tip of the third diamond is between that of the first and second diamonds. The third diamond is positioned to cut to a shallower depth than the first and second diamonds so that a land feature can be created between the grooves created by the first and second diamonds. The land feature may define a planar land between the two grooves, or may define a more complex land feature that has a shallower depth than the grooves created by the first and second diamond tips.

In one embodiment, the invention provides a cutting tool assembly comprising a mounting structure, a first tool shank mounted in the mounting structure, the first tool shank defining a first diamond tip that corresponds to a first groove to be created in a work piece, and a second tool shank mounted in the mounting structure, the second tool shank defining a second diamond tip that corresponds to a second groove to be created in the work piece, wherein positions of the first and second diamond tips define an integer number of pitches between grooves to be created in the work piece. In addition, the cutting tool assembly comprises a third tool shank mounted in the mounting structure between the first and second tool shanks, the third tool shank defining a third diamond tip to create a land feature in the work piece between the first and second grooves.

In another embodiment, the invention provides a diamond tooling machine used for creating grooves in a microreplication tool comprising a cutting tool assembly and an apparatus to receive the cutting tool assembly and to control positioning of the cutting tool assembly relative to the microreplication tool. The cutting tool assembly includes a mounting structure, a first tool shank mounted in the mounting structure, the first tool shank defining a first diamond tip that corresponds to a first groove to be created in the microreplication tool, a second tool shank mounted in the mounting structure, the second tool shank defining a second diamond tip that corresponds to a second groove to be created in the microreplication tool, wherein positions of the first and second diamond tips define an integer number of pitches of grooves to be created in the microreplication tool, and a third tool shank mounted in the mounting structure, the third tool shank defining a third diamond tip to create a land feature in the microreplication tool between the first and second grooves.

In another embodiment, the invention provides a cutting tool assembly comprising a mounting structure, a first tool shank mounted in the mounting structure, the first tool shank defining a first diamond tip that corresponds to a first groove to be created in a work piece, a second tool shank mounted in the mounting structure, the second tool shank defining a second diamond tip that corresponds to a second groove to be created in the work piece, wherein positions of the first and second diamond tips define a pitch between adjacent grooves of the work piece, a third tool shank mounted in the mounting structure, the third tool shank defining a third diamond tip to create a land feature in the work piece between the first and second grooves, and a means for securing the first, second and third tool shanks in the mounting structure such that a cutting location of the first diamond tip relative to the second diamond tip defines the pitch to within a tolerance of less than approximately 10 microns, and a cutting location of the third diamond tip defines a half pitch location relative to both the first and second diamond tips to within a tolerance of less than approximately 10 microns.

In another embodiment, the invention provides a method comprising defining a pitch spacing for a microreplication tool and creating a cutting tool assembly for creation of the microreplication tool by positioning first and second tool shanks in a mounting structure such that a cutting location of a first diamond tip associated with the first tool shank is a defined distance from a cutting location of a second diamond tip associated with the second tool shank, the defined distance corresponding to an integer number of the pitch spacing, wherein the defined distance is accurate to within a tolerance of less than approximately 10 microns, and positioning a third tool shank in a mounting structure such that a cutting location of a third diamond tip associated with the third tool shank is between the cutting locations of the first and second diamond tips to create a land feature in the microreplication tool.

In another embodiment, the invention comprises a cutting tool assembly comprising a mounting structure, a first tool shank mounted in the mounting structure, the first tool shank defining a first diamond tip that corresponds to a groove to be created in a work piece, and a second tool shank mounted in the mounting structure, the second tool shank defining a second diamond tip that corresponds to a land feature to be created in the work piece, wherein the second diamond tip is spaced at integer pitch spacing plus one-half pitch spacing relative to the first diamond tip, wherein a pitch refers to a distance between adjacent grooves created in the work piece.

By using multiple diamond cutting tips in the same cutting tool assembly, the creation of the microreplication tool may be improved or simplified. In particular, fewer cutting passes of the cutting tool assembly may be needed to cut the grooves and land features in the microreplication tool, which can reduce tooling costs.

In addition, the invention can improve land feature creation by using a third diamond tip, rather than leaving the land features un-tooled and defined by the original un-tooled surface of micro-replication tool. In this sense, the invention creates tooled lands using a third diamond tip between two groove cutting tips, wherein the third diamond tip cuts to a shallower depth than the grove cutting tips. The third diamond tip defines a different feature to be created in the microreplication tool relative to the first and second diamond tips. Again, in one example, the feature to be created by the third diamond tip comprises a planar land feature. In this case, the invention can improve the planarity of the microreplication tool that is created by the diamond cutting tool. In another example, the feature to be created by the third diamond tip comprises a land feature that includes a shallow sub-groove that is shallower than the first and second grooves created by the first and second diamonds. In this case, the land feature between the first and second grooves can itself define an optical feature to be created in a microreplication structure. The width of the sub-groove formed within the land feature may be less than the width of the land feature.

Additional details of these and other embodiments are set forth in the accompanying drawings and the description below. Other features, objects and advantages will become apparent from the description and drawings, and from the claims.

DETAILED DESCRIPTION

The invention is directed to cutting tool assemblies that include multiple diamonds. The cutting tool assemblies having multiple diamonds can be used in creating microreplication tools or other work pieces. The microreplication tools, in turn, may be used to create microreplicated structures, such as optical films, abrasive films, adhesive films, mechanical fasteners having self-mating profiles, or any molded or extruded parts having microreplicated features of relatively small dimensions, such as dimensions less than approximately 1000 microns.

In the following description, aspects of the invention are described in the context of the creation of optical film. In that case, the cutting tool assembly described herein is used to create a microreplication tool, which is in turn used to create the optical film. The described cutting tool assemblies, however, may be used to create a variety of other work pieces. Accordingly, the described cutting tool assemblies are not limited for use in creating microreplication tools or optical film, and may find use in a number of other tooling applications.

Figure 1:
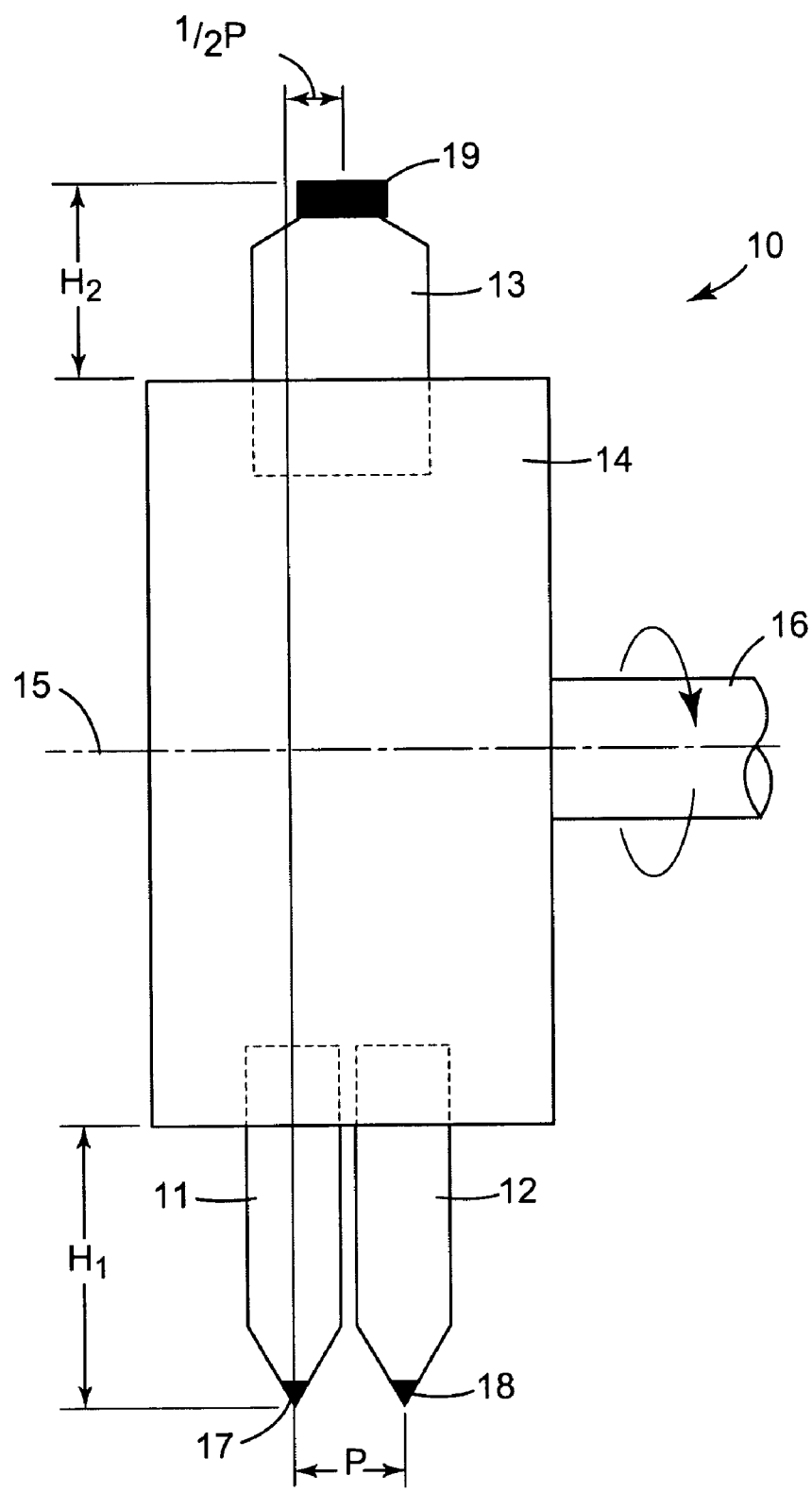
FIG. 1 is a conceptual top view of a multi-diamond cutting tool assembly configured for fly-cutting.
Figure 14:
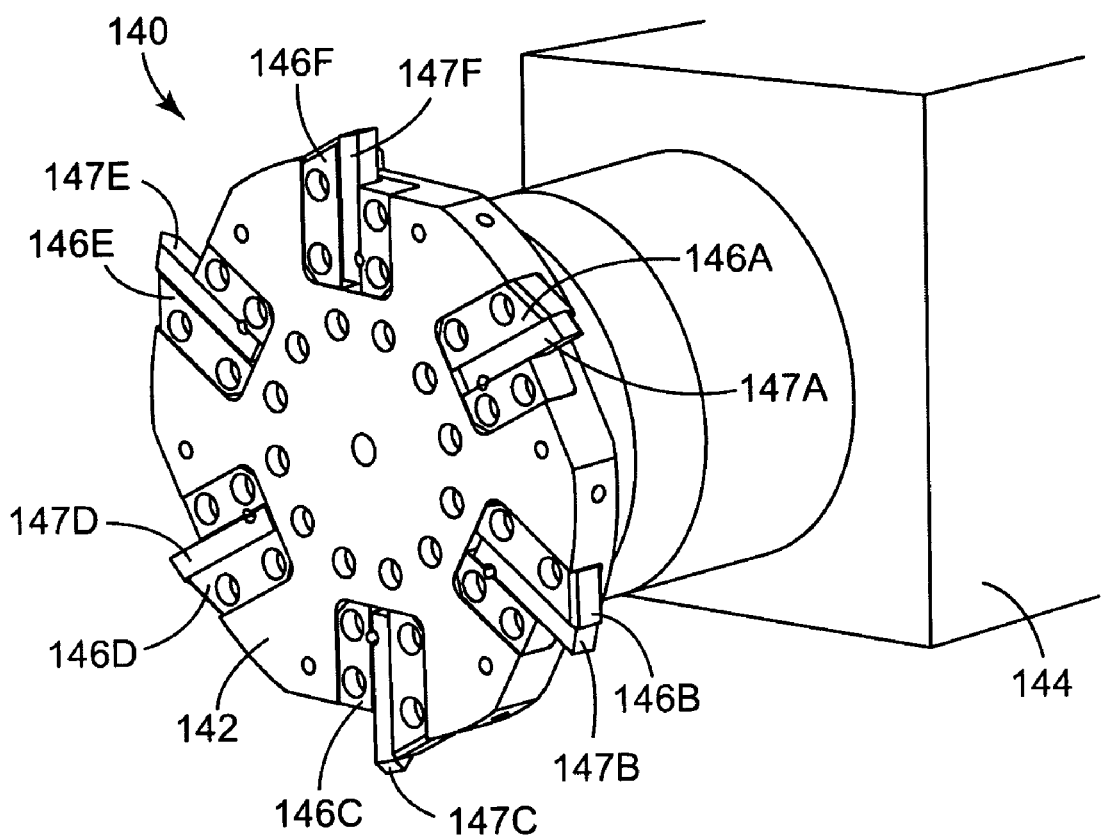
FIG. 14 is another perspective view of a fly-cutting tool according to an embodiment of the invention.

FIG. 1 is a top view of a cutting tool assembly 10 that includes three tool shanks 11, 12 and 13 mounted in a mounting structure 14. Cutting tool assembly 10 is configured for flycutting in which assembly 10 is rotated about an axis 15. For example, assembly 10 may be mountable to a drive shaft 16, which can be driven by a motor of a tooling machine (not shown) to rotate assembly 10. Mounting structure 14 may comprise a structure for holding tool shanks 11, 12 and 13 that have diamond tips 17, 18 and 19. The shanks 11, 12 and 13 may be formed from a metallic or composite material, and diamonds can be secured to shanks 11, 12 and 13 by a substantially permanent securing mechanism, such as a solder, braze or adhesive. Alternatively, shanks may be permanently secured to cartridges (not shown), which are in turn removably secured to a fly wheel. FIG. 14 is a perspective view of a fly-cutting tool 140 in which shanks 147 are permanently secured to cartridges 146, which are in turn removably secured to a fly wheel 142. FIG. 14 is described in greater detail below.

Referring again to FIG. 1, at least three diamond cutting surfaces, e.g., diamond tips 17, 18 and 19, are precisely positioned in cutting tool assembly 10. Cutting tool assembly 10 is then used to form grooves in a work piece to form a microreplication tool and land features in the microreplication tool between the grooves. More specifically, a first diamond is positioned such that a first diamond tip 17 creates a first groove in the microreplication tool and a second diamond is positioned such that a second diamond tip 18 creates a second groove the microreplication tool. The first and second grooves define integer pitch spacing in the microreplication tool and correspond to a pitch formed in optical film, which is subsequently created using the microreplication tool. Although the first and second tips 17, 18 are illustrated as cutting grooves of similar depths, the invention is not necessarily limited in this respect. For example, the invention also contemplates a tool that includes a first groove cutting tip at a first depth, a second groove cutting tip at a second depth, and a land cutting tip between the first and second groove cutting tips, the land cutting tip forming a land feature at a third depth less than the first and second depths.

The one pitch spacing is labeled "P" in FIG. 1. However, "P" may more generally refer to an integer number of pitches. If the spacing is larger than one pitch, then subsequent cutting passes of the tool may translate the cutting tips by one pitch in order to allow for feature creation at the pitch. In the following description, for simplicity, the invention is described in the context of pitch spacing between the groove cutting diamond tips 17 and 18. However, it is understood that more generally, the groove cutting diamond tips may be spaced at integer pitch spacing, with the land cutting diamond tip 19 spaced at integer pitch spacing plus one-half pitch spacing.

As shown in FIG. 1, a third diamond is positioned between the first and second diamonds such that a third diamond tip 19 creates a land feature in the microreplication tool between the first and second grooves. In this sense, a cutting tip of the third diamond is positioned at one-half pitch spacing with respect to cutting tips of the first and second diamonds. The one-half pitch spacing is labeled "½ P" in FIG. 1. Again, however, third diamond tip 19 may be, more generally, spaced at integer pitch spacing plus one-half pitch spacing. The notation of pitch spacing and one-half pitch spacing is used for simplicity in the following description, although integer pitch spacing of the groove cutting tips and integer pitch spacing plus one-half pitch spacing of the land cutting tips is more generally contemplated by this disclosure.

Depending on the dimensions of the microreplication tool to be created, the pitch spacing may be less than approximately 5000 microns, less than approximately 1000 microns, less than approximately 500 microns, less than approximately 200 microns, less than approximately 100 microns, less than approximately 50 microns, less than approximately 10 microns, less than approximately 5 microns or less than approximately 1 micron.

Each of tool shanks 11, 12 and 13 defines at least one diamond tip used as a cutting tip of cutting tool assembly 10, although multi-tip diamonds could also be used in one or more of shanks 11, 12 and 13. Again, at least two of the diamond cutting tips (e.g., tips 17 and 18) are precisely formed and positioned to correspond to grooves to be created in the microreplication tool, and at least one of the diamond cutting tips (e.g., tip 19) is precisely formed and positioned to correspond to a land feature to be created in the microreplication tool between the grooves. Any number of diamonds could be used, however, with grooves being defined at pitch spacing (or integer pitch spacing) and lands at one-half pitch spacing (or integer pitch spacing plus one-half pitch spacing). When the microreplication tool created with cutting tool assembly 10 is used to create the optical film, the grooves in the microreplication tool may correspond to lands in the film and the lands in the microreplication tool may correspond to grooves in the film.

The third diamond tip 19 is positioned to cut to a shallower depth than the first and second diamond tips 17, 18 so that a land feature can be created between the grooves in the microreplication tool. For example height $H_1$ may be larger than height $H_2$ such that the distance from diamond tips 17, 18 to axis 15 is larger than the distance from diamond tip 19 to axis 15. Therefore, the cutting performed by diamond tips 17, 18 delves further into the microreplication tool than the cutting performed by diamond tip 19 such that diamond tips 17, 18 create grooves and diamond tip 19 creates a land feature.

The land feature may define a planar land between the two grooves, or may define a more complex land feature that has a shallower depth than the grooves created by the first and second diamond tips. In either case, the tooling process can be improved, particularly for land feature creation. In the example of FIG. 1, the feature to be created by third diamond tip 19 may comprise a planar land feature, in which case the invention can improve the planarity of the microreplication tool that is created by cutting tool assembly 10. In particular, the planarity of the tooled land feature may be improved relative to a microreplication tool with an untooled land feature that conforms to the original surface of a work piece. In another example, (e.g., as shown and discussed below with reference to FIGS. 5 and 6) the land feature to be created by the third diamond (or other diamonds located at one-half pitch spacing) may comprise a land feature that includes a shallow groove relative to the first and second grooves created by the first and second diamonds. In this case, the land feature between the first and second grooves can itself define another optical feature to be created in a microreplication structure via the microreplication tool.

Cutting tool assembly 10 may be used to cut a plurality of grooves and at least one land between the grooves on a microreplication tool with a single cutting pass of cutting tool assembly 10. Thus, the cutting time associated with the creation of a microreplication tool can be reduced relative to using single tip tools, or more complex patterns can be formed in a given period of time. In this manner, the production cycle associated with the ultimate creation of microreplication structures can be reduced, and the production process may be simplified. Subsequent cutting passes over the lands may also be avoided, thereby avoiding conventional alignment problems associated with such subsequent cutting passes.

The tips 17, 18 and 19 of the diamonds in tool shanks 11, 12 and 14 can be formed, for example, using lapping techniques, grinding techniques, or focused ion beam milling processes. Various shapes and sizes of the diamond tips are also described, which may be useful in the creation of different microreplication tools. Focused ion beam milling processes, in particular, may be used to perfect the desired shapes of the diamond tips with extreme accuracy.

The different tool shanks of the cutting tool assembly can be mounted in a mounting structure using microscopic positioning techniques. For example, the techniques may involve the use of a tooling microscope with positioning controls. The microscope can be used to identify and measure the position of the diamond tips relative to one another so that the tool shanks can be properly positioned within the mounting structure. Positioning feedback can be provided to quantify the positioning of the diamond tips, e.g., in the form of a digital readout, analog readout, graphic display, or the like. The feedback can be used to precisely position the different tool shanks in the mounting structure. Once positioned, the tool shanks can be secured in the mounting structure by any suitable securing mechanism. In this manner, the tool shanks can be positioned in the mounting structure such that a cutting location of a first diamond tip is one pitch from a cutting location of a second diamond tip, and the cutting location of a third diamond tip is positioned at one-half pitch spacing relative to the first and second cutting tips.

The use of a microscope and positioning feedback to precisely position the multiple tool shanks within the mounting structure can ensure placement of the diamond tips relative to one another to tolerances required for effective tooling of microreplication tools. In particular, positioning to locations within tolerances of less than 10 microns, and more preferably less than 1 micron can be achieved. Moreover, positioning of the diamond tips to locations relative to one another within tolerances on the order of 0.5 microns can be achieved using a tooling microscope like that described herein. Such precision placement is desirable for effective creation of microreplication tools that can be used for creating a wide variety of microreplicated structures such as microreplicated optical films, microreplicated mechanical fasteners, microreplicated abrasive films, microreplicated adhesive films, or the like.

In order to secure the diamonds in tool shanks 11, 12 and 13 and thereby define diamond tips 17, 18 and 19, a substantially permanent securing mechanism can be used such as, brazing, soldering, an adhesive such as an epoxy, or the like. Tool shanks 11, 12 and 13 with diamond tips 17, 18 and 19 can then be mounted in mounting structure 14 via a temporary securing mechanism such as one or more bolts, clamps or set screws (not shown). Alternatively brazing, soldering, an adhesive such as an epoxy, or another more permanent securing mechanism may be used to secure tool shanks 11, 12 and 13 in mounting structure 14. In any case, the use of a tooling microscope with positioning controls and positioning feedback can ensure that tool shanks 11, 12 and 13 are positioned within mounting structure 14 such that diamond tips 17, 18 and 19 are positioned relative to one another with the precision required for effective manufacture of microreplication tools. Mounting structure 14 may have a shape that allows cutting tool assembly 10 to be inserted into a diamond tooling machine.

Figure 2:
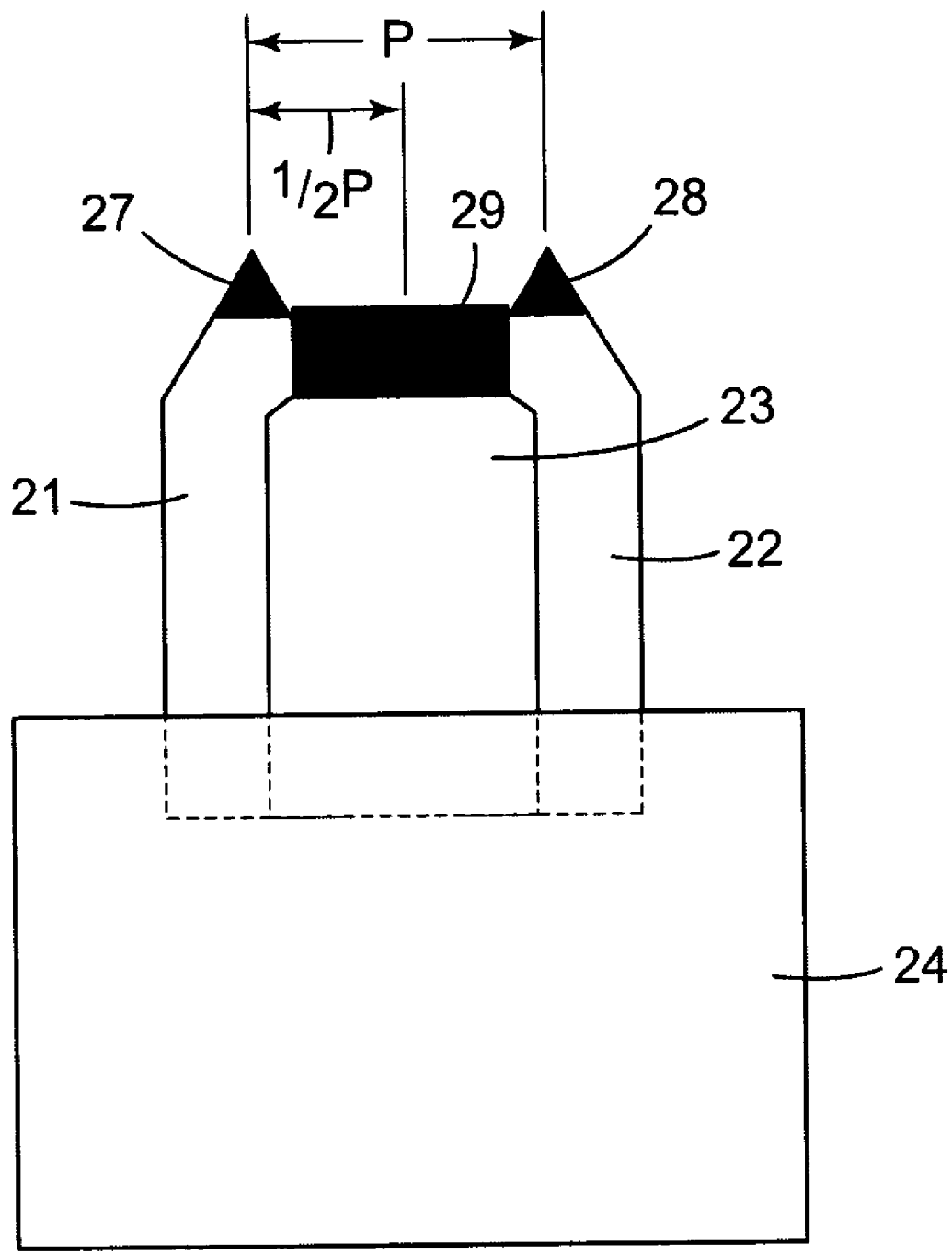
FIG. 2 is a conceptual top view of a multi-diamond cutting tool assembly configured for plunge cutting, thread cutting or scribe cutting.

FIG. 2 is a conceptual top view of a multi-diamond cutting tool assembly 20 configured for scribe cutting, plunge cutting or thread cutting. As can be appreciated from FIG. 2, a cutting tool assembly according to the invention may assume different configurations, depending on whether it is designed for flycutting or other types of cutting. Other non-fly cutting examples include scribe cutting, plunge cutting or thread cutting. In plunge cutting, a cutting tool assembly 20 is plunged into a moving work piece at defined locations for intervals of time before moving to other locations to cut various grooves or other features. Thread cutting is similar to plunge cutting. However, in thread cutting, cutting tool assembly 20 is displaced into a moving work piece for longer periods of time to cut long threaded grooves. Scribe cutting or ruling is similar to thread cutting, but in scribe cutting, the cutting tool assembly 20 is displaced through a work piece very slowly.

Like assembly 10 of FIG. 1, cutting tool assembly 20 of FIG. 2 includes multiple tool shanks 21, 22 and 23 secured within a mounting structure 24. In order to secure the diamonds in tool shanks 21, 22 and 23 and thereby define diamond tips 27, 28 and 29, a substantially permanent securing mechanism can be used such as, brazing, soldering, an adhesive such as an epoxy, or the like. The tool shanks 21, 22 and 23 with diamond tips 27, 28 and 29, can then be mounted in mounting structure 24 via a temporary securing mechanism such as one or more bolts, clamps or set screws. Alternatively, brazing, soldering, an adhesive such as an epoxy, or another more permanent securing mechanism may be used to secure tool shanks 21, 22 and 23 in mounting structure 24.

The use of a tooling microscope with positioning feedback can ensure that diamond tips 27, 28 and 29 of tool shanks 21, 22 and 23 are positioned within mounting structure 24 with the precision required for effective tooling of microreplication tools. Mounting structure 24 may have a shape that allows cutting tool assembly 20 to be inserted into a diamond tooling machine configured for plunge cutting, thread cutting, scribing or ruling.

Like in FIG. 1, the cutting tool assembly 20 of FIG. 2 includes two diamond tips 27 and 28 spaced one pitch (P) apart to form grooves in a work piece. A third diamond dip 29 is spaced at one-half pitch (½ P) relative to tips 27 and 28 to define a land feature in the work piece. Again, The notation of pitch spacing and one-half pitch spacing is used for simplicity in the embodiments described herein. More generally, integer pitch spacing of the groove cutting tips and integer pitch spacing plus one-half pitch spacing of the land cutting tips is contemplated by this disclosure. If the spacing of the tips is larger than one pitch (i.e., spacing at integer pitches greater than 1), then subsequent cutting passes of the tool creates the grooves at the desired pitch. In the following description, every reference to pitch spacing of diamond tips also contemplates integer pitch spacing of such tips, and every reference to one-half pitch spacing of diamond tips contemplates integer pitch spacing plus one-half pitch spacing.

Figure 3:
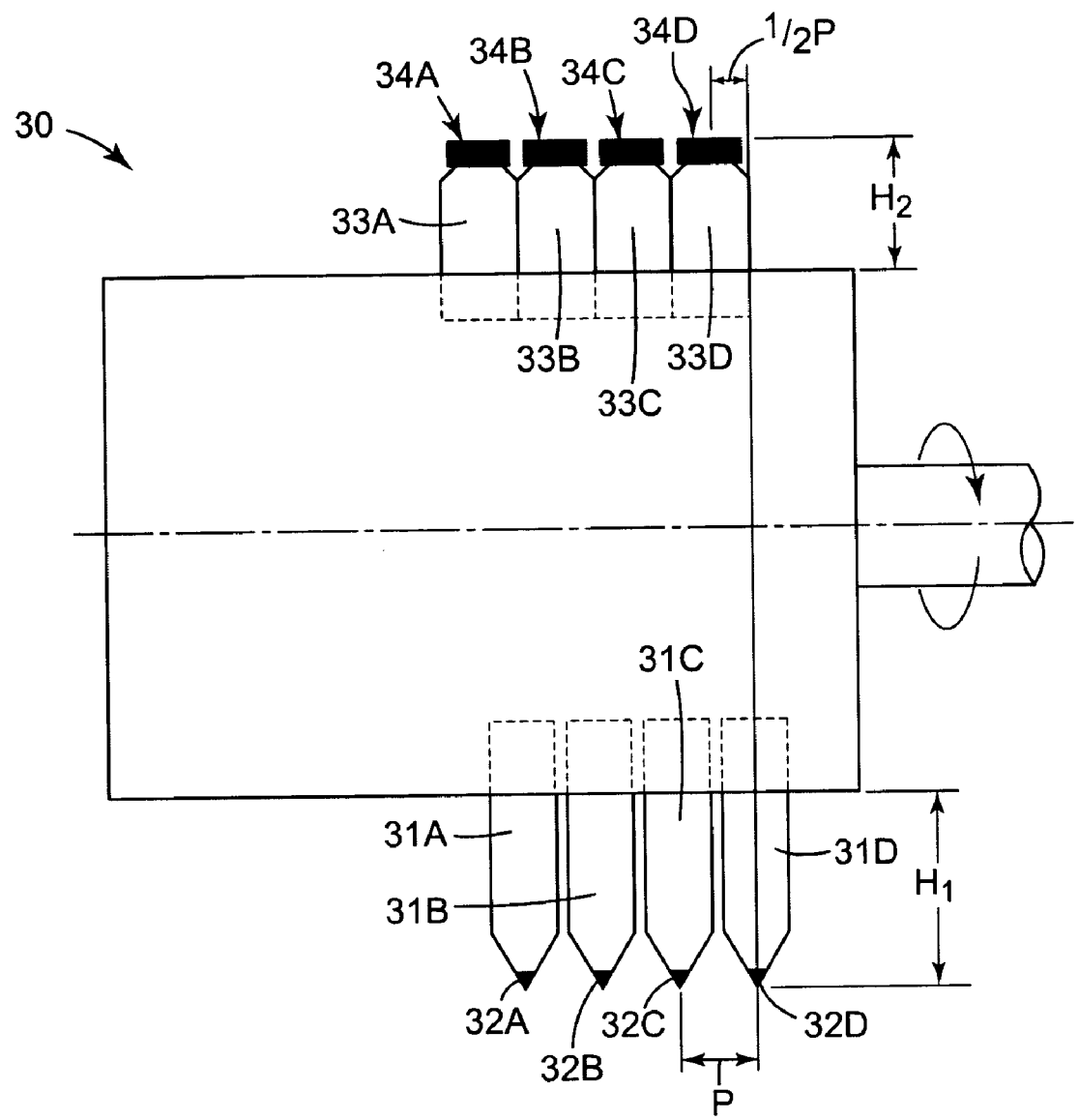
FIG. 3 is a conceptual top view of another embodiment of a multi-diamond cutting tool assembly configured for fly-cutting.

FIG. 3 is a conceptual top view of another embodiment of a multi-diamond cutting tool assembly 30 configured for fly-cutting. In this example, more tool shanks and more diamond tips are used. Indeed, any number of tool shanks and diamond tips could be used. In cutting tool assembly 30 of FIG.3, four tool shanks 31A, 31B, 31C and 31D (collectively shanks 31) that define diamond tips 32A, 32B, 32C and 32D (collectively diamond tips 32) for groove feature creation. Diamond tips 32 are spaced one pitch (P) apart from one another. Moreover, tips 32 are positioned at a height $H_1$ to define a groove depth in a microreplication tool.

Cutting tool assembly 30 also includes four additional tool shanks 33A, 33B, 33C and 33D (collectively shanks 33) that define diamond tips 34A, 34B, 34C and 34D (collectively diamond tips 34) for land feature creation. Diamond tips 34 are also spaced one pitch (P) apart from one another, but are spaced one-half pitch relative to tips 32, which are used to create grooves. Tips 34 are positioned at a height $H_2$, which is less than height $H_1$ of tips 32. In this manner, planarity of lands features can be improved in the tooling of microreplication tools used to create microreplicated structures.

Figure 4:
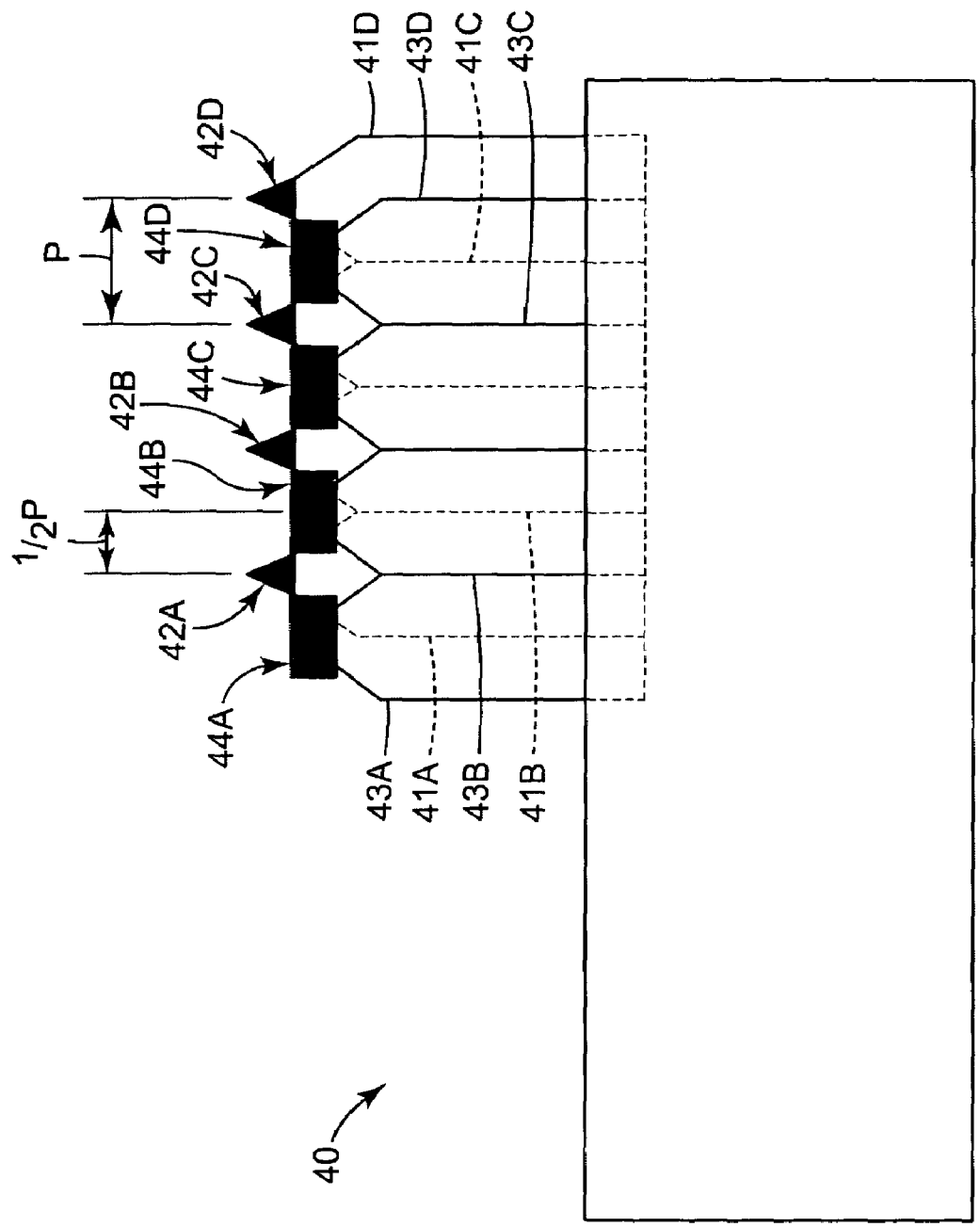
FIG. 4 is a conceptual top view of another embodiment of a multi-diamond cutting tool assembly configured for plunge cutting, thread cutting or scribe cutting.

FIG. 4 is a conceptual top view of another embodiment of a multi-diamond cutting tool assembly 40 configured for scribe cutting, plunge cutting or thread cutting. In FIG. 4, like the example of FIG. 3, several tool shanks and several diamond tips are used. Again, any number of tool shanks and diamond tips could be used. In cutting tool assembly 40 of FIG. 4, four tool shanks 41A, 41B, 41C and 41D (collectively shanks 41) that define diamond tips 42A, 42B, 42C and 42D (collectively diamond tips 42) for groove feature creation. Diamond tips 42 are spaced one pitch (P) apart from one another. Moreover, tips 42 are positioned at a height to define a groove depth in a microreplication tool.

Cutting tool assembly 40 also includes four additional tool shanks 43A, 43B, 43C and 43D (collectively shanks 43), which are positioned between shanks 41. Tool shanks 43 define diamond tips 44A, 44B, 44C and 44D (collectively diamond tips 44) for land feature creation. Diamond tips 44 are also spaced one pitch (P) apart from one another, but are spaced one-half pitch relative to tips 42, which are used to create grooves. Tips 44 are positioned at a height that is less than the height of tips 42. In this manner, planarity of lands features can be improved in the tooling of microreplication tools used to create microreplicated structures.

Figure 5:
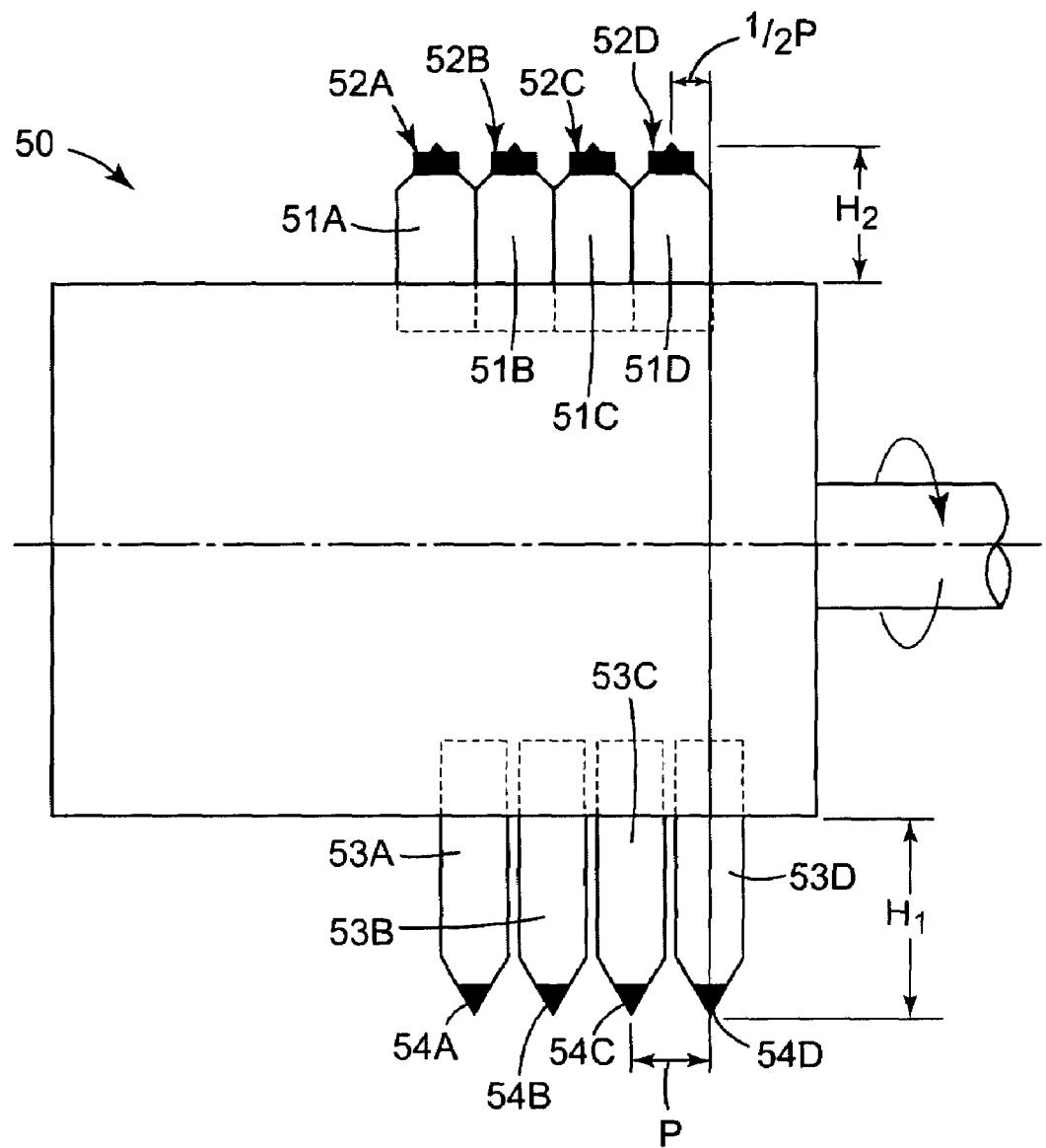
FIG. 5 is a conceptual top view of another embodiment of a multi-diamond cutting tool assembly configured for fly-cutting.

FIG. 5 is a conceptual top view of another embodiment of a multi-diamond cutting tool assembly 50 configured for fly-cutting. In cutting tool assembly 50 of FIG. 5, four tool shanks 53A, 53B, 53C and 53D (collectively shanks 53) that define diamond tips 54A, 54B, 54C and 54D (collectively diamond tips 54) for groove feature creation. Diamond tips 54 are spaced one pitch (P) apart from one another. Moreover, tips 54 are positioned at a height HI to define a groove depth in a microreplication tool.

Cutting tool assembly 50 also includes four additional tool shanks 51A, 51B, 51C and 51D (collectively shanks 51) that define diamond tips 52A, 52B, 52C and 52D (collectively diamond tips 52) for land feature creation. Diamond tips 52 are also spaced one pitch (P) apart from one another, but are spaced one-half pitch relative to tips 54, which are used to create grooves. Tips 52 are positioned at a height $H_2$, which is less than height $H_1$ of tips 54. In this manner, planarity of lands features can be improved in the tooling of microreplication tools used to create microreplicated structures. Moreover, in contrast to cutting tool assembly 30 of FIG. 3, the diamond tips 52 used for land feature creation include sub-tips, which define micro-groove sub-features in a land feature. In this manner, more complex land features can be created, e.g., to allow for the creation of more complex optical film.

Figure 6:
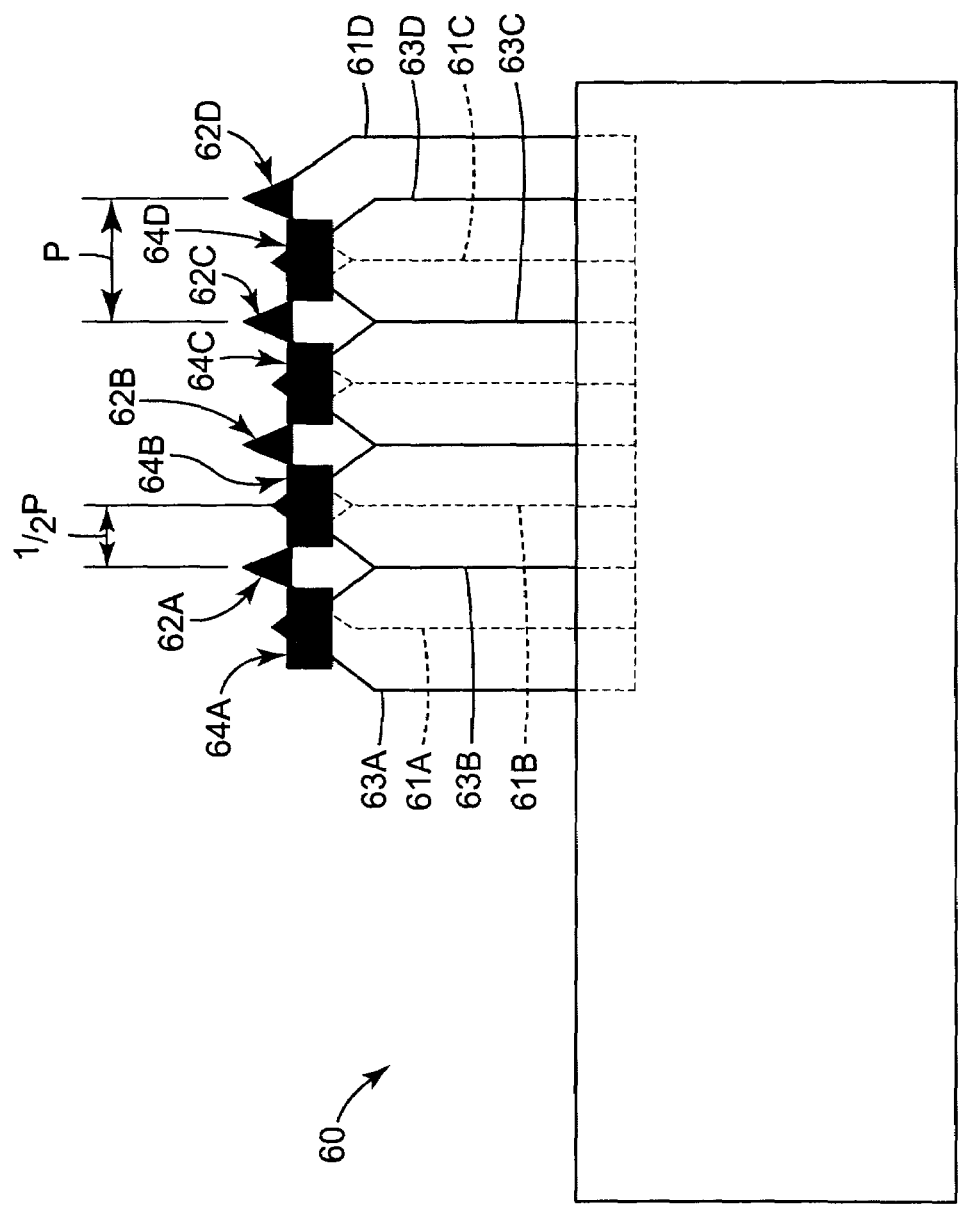
FIG. 6 is a conceptual top view of another embodiment of a multi-diamond cutting tool assembly configured for plunge cutting, thread cutting or scribe cutting.

FIG. 6 is a conceptual top view of another embodiment of a multi-diamond cutting tool assembly 60 configured for scribe cutting, plunge cutting or thread cutting. In FIG. 6, like the example of FIG. 4, several tool shanks and several diamond tips are used. Again, any number of tool shanks and diamond tips could be used. In cutting tool assembly 60 of FIG. 6, four tool shanks 61A, 61B, 61C and 61D (collectively shanks 61) that define diamond tips 62A, 62B, 62C and 62D (collectively diamond tips 62) for groove feature creation. Diamond tips 62 are spaced one pitch (P) apart from one another. Moreover, tips 62 are positioned at a height to define a groove depth in a microreplication tool.

Cutting tool assembly 60 also includes four additional tool shanks 63A, 63B, 63C and 63D (collectively shanks 63), which are positioned between shanks 61. Tool shanks 63 define diamond tips 64A, 64B, 64C and 64D (collectively diamond tips 64) for land feature creation. Diamond tips 64 are also spaced one pitch (P) apart from one another, but are spaced one-half pitch relative to tips 62, which are used to create grooves. Tips 64 are positioned at a height that is less than the height of tips 62. In this manner, planarity of lands features can be improved in the tooling of microreplication tools used to create microreplicated structures. Like the cutting tool assembly 50 of FIG. 5, cutting tool assembly 60 of FIG. 6 utilizes land cutting diamond tips 64 that include sub-tips, which define micro-groove sub-features in a land feature. In this manner, more complex land features can be created, e.g., to allow for the creation of more complex optical film.

Figure 7:
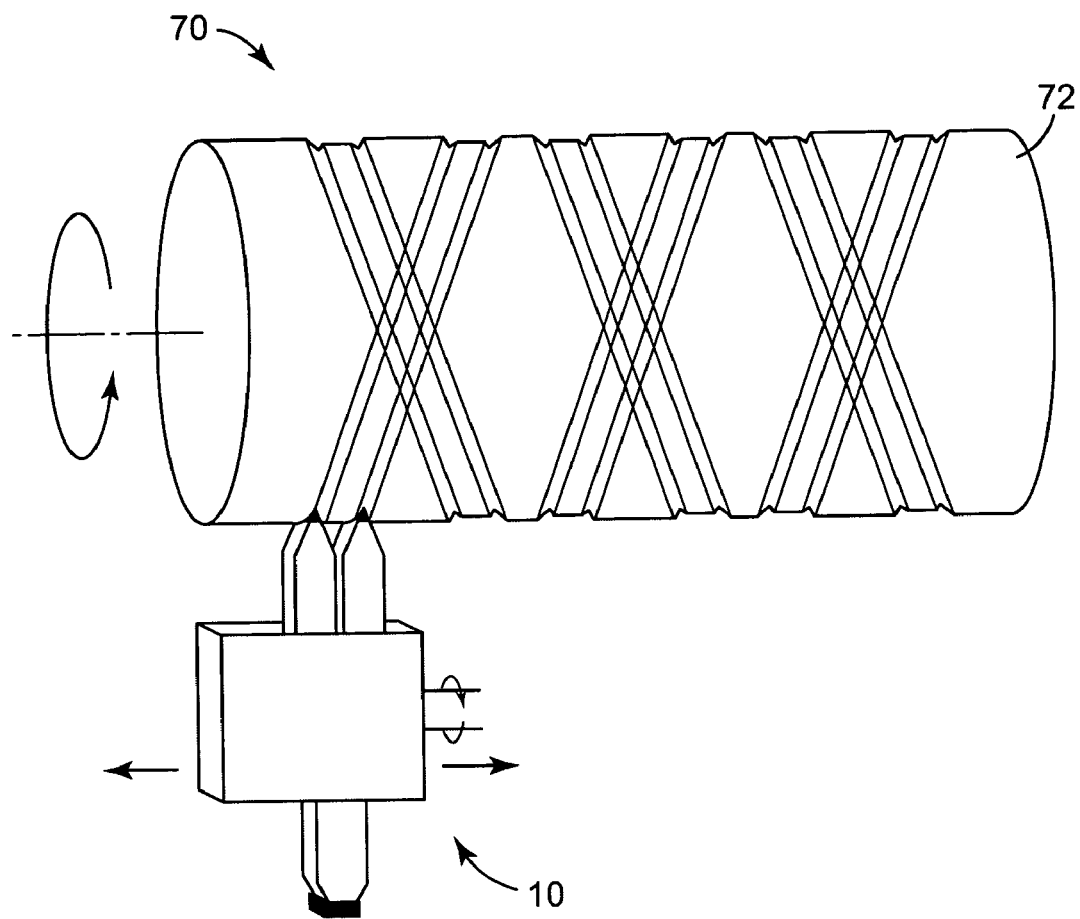
FIG. 7 is a conceptual perspective view of a multi-diamond fly cutting tool assembly simultaneously cutting two grooves and a land during the creation of a microreplication tool.
Figure 8:
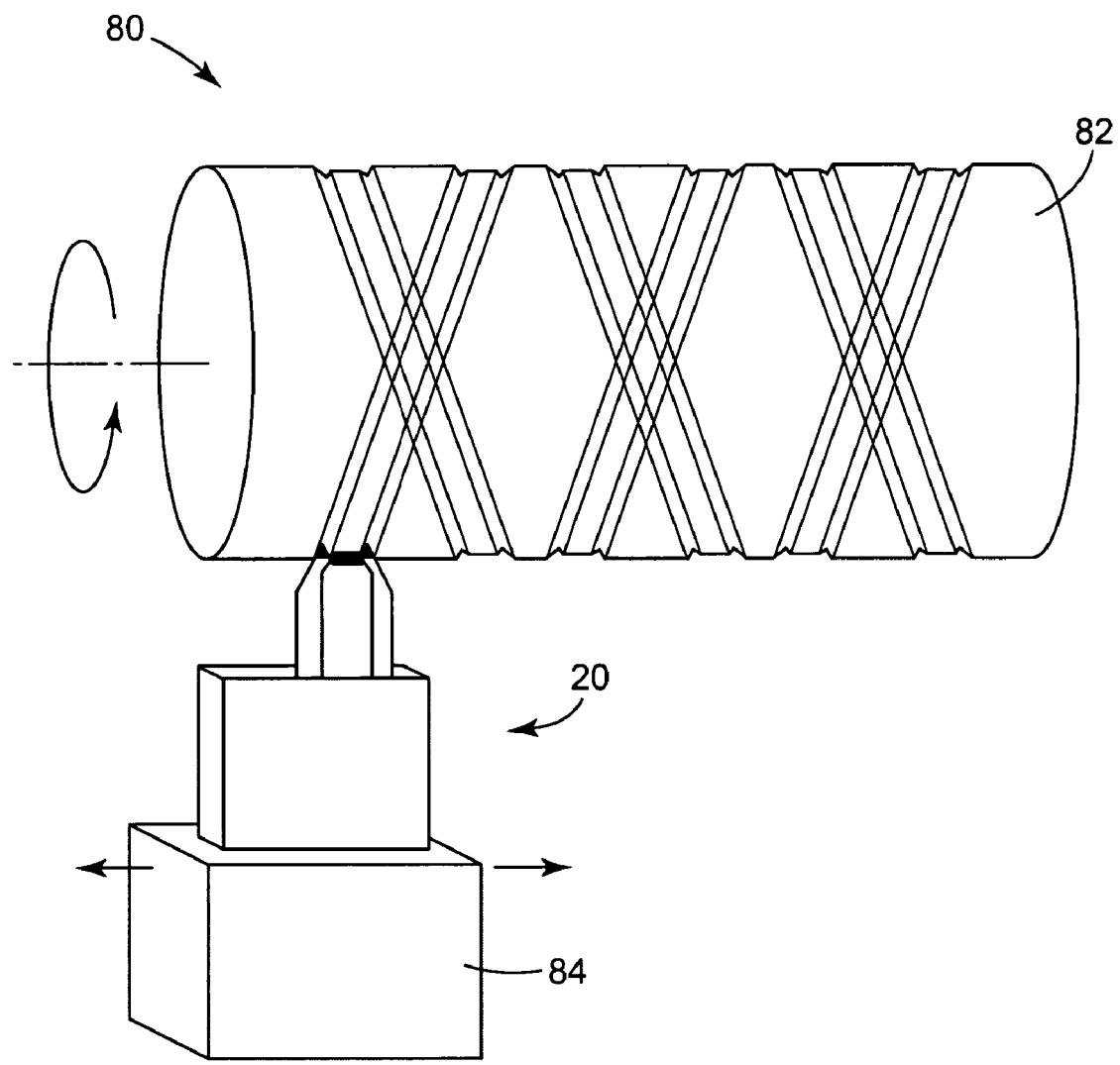
FIG. 8 is a conceptual perspective view of a multi-diamond cutting tool assembly simultaneously cutting two grooves and a land during the creation of a microreplication tool.

FIGS. 7 and 8 are conceptual perspective views of systems 70 and 80 that use multi-diamond cutting tool assemblies 10 and 20 to simultaneously cut two grooves during the creation of a microreplication tool 72 (FIG. 7) or 82 (FIG. 8). In the examples of FIGS. 7 and 8, the respective microreplication tool 72 or 82 comprises a casting roll, although other microreplication tools such as casting belts, injection molds, extrusion or embossing tools, or other work pieces could also be created using cutting tool assembly 10 or cutting tool assembly 20. In some examples, the work piece may be planar rather than a roll as shown in FIGS. 7 and 8. In FIG. 7, cutting tool assembly 10 may be rotated about an axis. Cutting tool assembly 10 may also be moved relative to microreplication tool 72 in lateral directions (as illustrated by the arrows). At the same time, microreplication tool 72 may be rotated about an axis. As cutting tool assembly 10 is rotated, two diamond tips cut grooves into the microreplication tool 72 while a third diamond tip cuts a land between the grooves. In this manner, two grooves are formed in a single cutting pass of cutting tool assembly 10, and a high quality land is formed between the grooves. More complex land features may also be defined, e.g., by using a more complex diamond tip shape for the tip that creates the land features.

As shown in FIG. 8, cutting tool assembly 20 may be secured in a diamond tooling machine 84 that positions the cutting tool assembly 20 relative to microreplication tool 82, and moves the cutting tool assembly 20, e.g., in lateral directions (as illustrated by the arrows) relative to the microreplication tool 82. At the same time, microreplication tool 82 may be rotated about an axis. Diamond tooling machine 84 may be configured to pass the cutting tool assembly 20 into a rotating microreplication tool 82 via plunge or thread cutting techniques in order to cut grooves in the microreplication tool 82. Alternatively, diamond tooling machine 84 may be configured for scribing or ruling, in which cutting tool assembly 20 is displaced through microreplication tool 82 very slowly. In any case, grooves and high quality lands can be formed on microreplication tool 82. The formed grooves and lands may define the ultimate form of microreplicated structures created using the microreplication tool 72 (FIG. 7) or 82 (FIG. 8), for example, during an extrusion process.

If desired, systems 70 and 80 may use a fast tool servo (not shown). For example, referring to FIG. 8, a fast tool servo could be employed between cutting tool assembly 20 and the tooling machine 84 that receives cutting tool assembly 20. In this case, the fast tool servo may vibrate the cutting tool assembly 20 for creating of particular microstructures in microreplication tool 82.

Because the cutting tool assembly 10, 20 implements multiple tool shanks, and thus multiple diamond cutting tips, fewer passes of the cutting tool assembly are needed to cut the grooves on the microreplication tool. This can reduce production costs and speed the production cycle associated with creation of microreplication tools. Moreover, systems 70 and 80 may improve land feature creation by using a third diamond tip, rather than leaving the land features un-tooled and defined by the original un-tooled surface of microreplication tool 72 or 82. In the illustrated example of FIGS. 7 and 8, the feature to be created by the third diamond tip comprises a planar land feature. In this case, the invention can improve the planarity of microreplication tool 72, 82 that is created by diamond cutting tool 10, 20. In other examples, however, the feature to be created by the third diamond tip comprises a land feature that includes a small and shallow groove (or other sub-feature). In this case, the land feature between the first and second grooves can itself define an optical feature to be created in a microreplication structure. The width of the sub-feature formed in the land feature may be less than the width of the land feature.

Microreplication tools 72 and 82, or any work piece created using the techniques described herein, may be formed of copper, nickel, aluminum, plastic such as acrylic, or any material capable of being machined. Generally, the machining techniques described herein may be implemented by moving only the diamond cutting tips, by moving only the work piece relative to the diamond cutting tips, or by moving both the work piece and the diamond cutting tips.

The sizes of the diamond tips described herein may be defined by a cutting height ($H_{CUTTING}$), the cutting width ($W_{CUTTING}$), and pitch variables (P) and (½ P) defined above. The cutting height ($H_{CUTTING}$) defines the maximum depth that the diamond can cut in a work piece, and may also be referred to as the cutting depth. The cutting width ($W_{CUTTING}$) may be defined as the average cutting width, or the maximum cutting width of a tip. Another quantity that can be used to define the size of the cutting tips is referred to as the aspect ratio. The aspect ratio is the ratio of height ($H_{CUTTING}$) to width ($W_{CUTTING}$). Diamond tips created by focused ion beam milling processes can achieve various heights, widths, pitches, and aspect ratios.

For example, the height ($H_{CUTTING}$) and/or the width ($W_{CUTTING}$) can be formed to be less than approximately 500 microns, less than approximately 200 microns, less than approximately 100 microns, less than approximately 50 microns, less than approximately 10 microns, less than approximately 1.0 micron, or less than approximately 0.1 micron. Additionally, the pitch variable (P) may be defined to be less approximately 5000 microns, less than approximately 1000 microns, less than approximately 500 microns, less than approximately 200 microns, less than approximately 100 microns, less than approximately 50 microns, less than approximately 10 microns, less than approximately 5 microns, less than approximately 1.0 micron, and may approach 0.5 micron. In some cases, by using offset positioning of tool shanks, the pitch (P) may be less than the width of the tool shanks.

The aspect ratio ($H_{CUTTING}:W_{CUTTING}$) may be defined to be greater than approximately 1:5, greater than approximately 1:2, greater than approximately 1:1, greater than approximately 2:1, or greater than approximately 5:1. Larger or smaller aspect ratios may also be achieved using focused ion beam milling. These different shapes and sizes may be advantageous for various applications.

Focused ion beam milling refers to a process in which ions, such as gallium ions, are accelerated toward the diamond in order to mill away atoms of the diamond (sometimes referred to as ablation). The acceleration of gallium ions may remove atoms from the diamond on an atom by atom basis. Vapor enhancing techniques using water vapors may also be used to improve the focused ion beam milling process. One suitable focused ion beam milling machine is the Micrion model 9500, commercially available from FEI Inc. of Portland Oreg. In general, focused ion beam milling can be performed to create precision tipped diamonds that correspond to the features to be created. One exemplary provider of focused ion beam milling services that may be used to create one or more ion beam milled diamonds is Materials Analytical Services of Raleigh, N.C.

Focused ion beam milling is generally very expensive. Therefore, to reduce the costs associated with the creation of a multi-tipped diamond, it is desirable to initially process the diamond tip to be ion beam milled prior to submitting the diamond tip to the focused ion beam milling process. For example, less expensive techniques such as lapping or grinding may be used to remove significant portions of the diamond tip. The focused ion beam milling process may ensure that one or more of the dimensions or features listed above can be achieved. Still, by initially processing the diamond tip prior to focused ion beam milling, the amount of focused ion beam milling time required to create the final ion beam milled diamond tip can be reduced. Lapping refers to a process of removing material from the diamond using a loose abrasive, whereas grinding refers to a process in which material is removed from the diamond using an abrasive that is fixed in a medium or substrate.

Figure 9A:
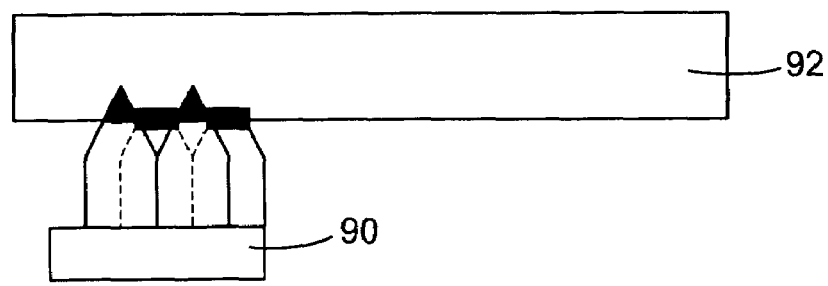
FIGS. 9A-9D are various cross-sectional top views illustrating a multi-diamond cutting tool assembly cutting grooves and flat land features into a work piece.
Figure 9B:
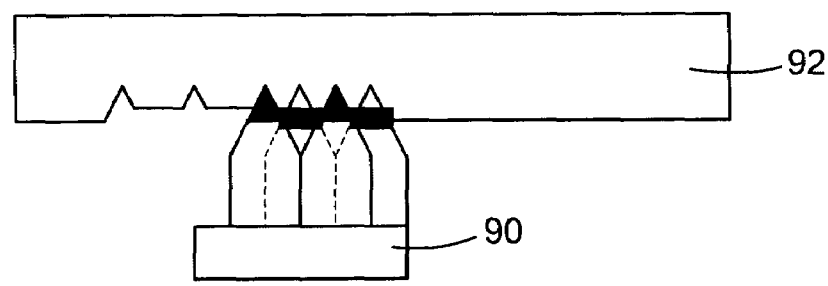
Figure 9C:
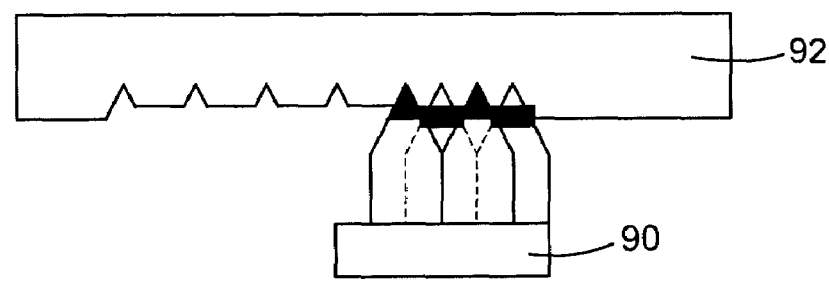
Figure 9D:
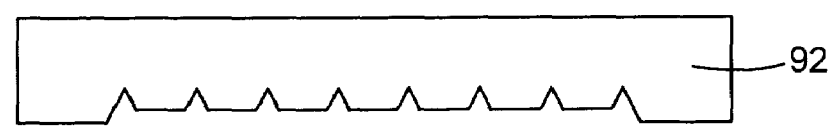

FIGS. 9A-9D are cross-sectional top views illustrating a cutting tool assembly 90 cutting grooves into a work piece 92. In particular, FIG. 9A is a cross-sectional top view illustrating a multi-diamond cutting tool assembly 90 cutting a first set of grooves and lands into work piece 92. FIG. 9B is a cross-sectional top views illustrating cutting tool assembly 90 cutting a second set of grooves and lands into work piece 92, and FIG. 9C is a cross-sectional top views illustrating cutting tool assembly 90 cutting a third set of grooves and lands into work piece 92. FIG. 9D is a top view illustrating the created work piece 92 after four passes of cutting tool assembly 90. Work piece 92 may correspond to a microreplication tool as outlined above, although the invention is not necessarily limited in that respect. As shown, the land features are flat and coplanar as defined by the land cutting diamond tips spaced at one-half pitch spacing relative to the groove cutting diamond tips.

Figure 10A:
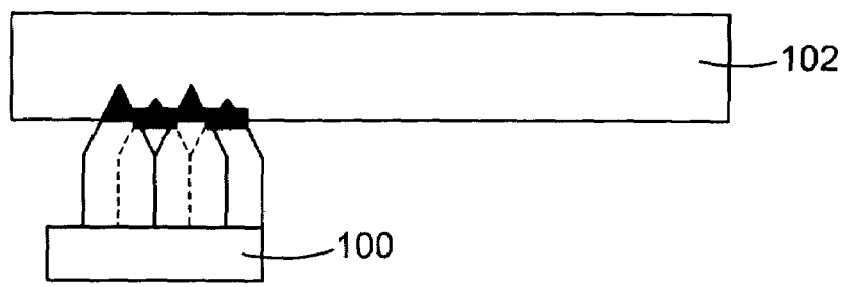
FIGS. 10A-10D are various cross-sectional top views illustrating a multi-diamond cutting tool assembly cutting grooves and lands with sub-features into a work piece.
Figure 10B:
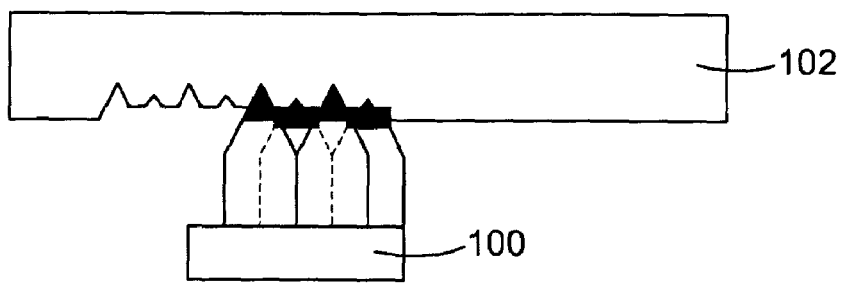
Figure 10C:
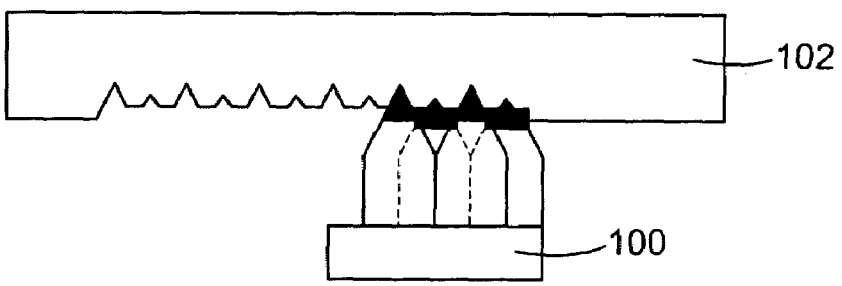
Figure 10D:
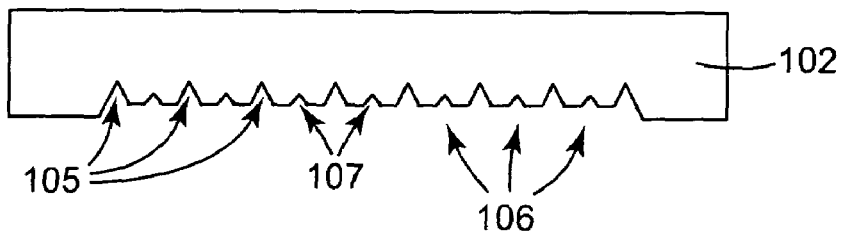

FIGS. 10A-10D are cross-sectional top views illustrating a cutting tool assembly 100 cutting grooves into a work piece 102. In particular, FIG. 10A is a cross-sectional top view illustrating a multi-diamond cutting tool assembly 100 cutting a first set of grooves and lands into work piece 102. FIG. 10B is a cross-sectional top views illustrating cutting tool assembly 100 cutting a second set of grooves and lands into work piece 102, and FIG. 10C is a cross-sectional top views illustrating cutting tool assembly 100 cutting a third set of grooves and lands into work piece 102. FIG. 10D is a top view illustrating the created work piece 102 after four passes of cutting tool assembly 100. Like in FIG. 9D, the created work piece 102 of FIG. 10D may correspond to a microreplication tool as outlined above, although the invention is not necessarily limited in that respect. As shown, the land features 106 are flat and coplanar but include sub-features 107, which in this example take the form of micro-grooves that are shallower than groove features 105.

Figure 11:
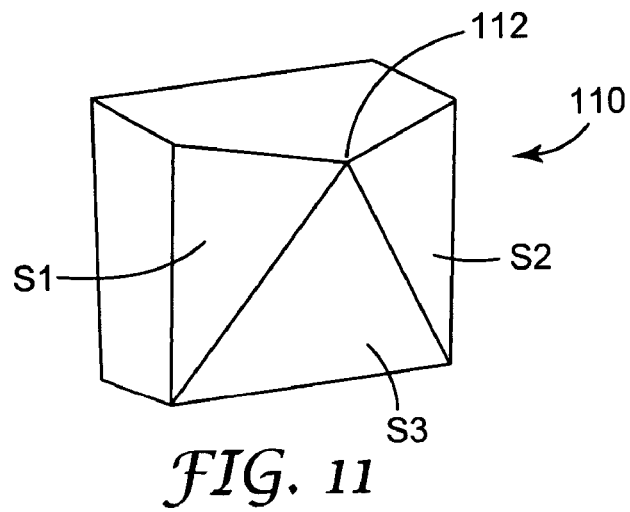
FIG. 11 is a perspective view of an exemplary diamond that can be used in a multi-diamond cutting tool assembly as one of the groove cutting diamonds at pitch spacing.

FIG. 11 is a perspective view of a diamond 110 that can be secured into a tool shank and then used in a cutting tool assembly. Diamond 110 may correspond to any of diamond tips 17, 18, 27 or 28 described above. As shown in FIG. 11, diamond 110 may define a cutting tip 112 defined by at least three surfaces (S1-S3). Surfaces S1, S2 and S3 may be created by grinding or lapping techniques, and may be perfected by focused ion beam milling techniques.

Figure 12:
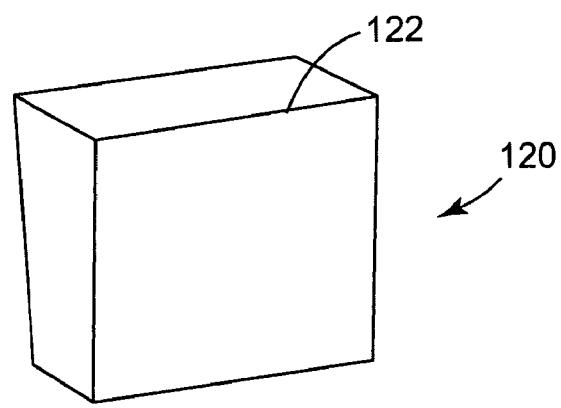
FIG. 12 is a perspective view of an exemplary diamond that can be used in a multi-diamond cutting tool assembly as a land cutting diamond at half-pitch spacing.

FIG. 12 is a perspective view of a diamond 120 that can be secured into a tool shank and then used in a cutting tool assembly. Diamond 120 may correspond to either of diamond tips 19 or 29 described above. As shown in FIG. 12, diamond 120 may define a flat cutting tip 122 which can create flat land features.

Figure 13:
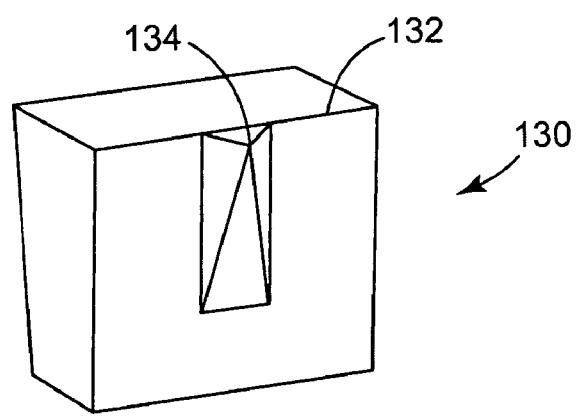
FIG. 13 is a perspective view of an exemplary diamond that can be used in a multi-diamond cutting tool assembly as a land cutting diamond at half-pitch spacing to cut land features with micro-grooves.

FIG. 13 is a perspective view of a diamond 130 that can be secured into a tool shank and then used in a cutting tool assembly. As shown in FIG. 13, diamond 130 may define a flat cutting tip 132 that includes a small sub-tip 134 to define micro-groove sub-features in a land feature. Sub-tip 134 may have a shape that is like that of diamond 110 in FIG. 11, but is a smaller protruding feature a larger diamond 130. Diamond 130 with flat cutting tip 132 and sub-tip 134 may be used to define land features that include micro-grooves. Again, focused ion beam milling techniques may be used to define the diamond shapes described herein.

FIG. 14 is another perspective view of a fly-cutting tool according to an embodiment of the invention. In tool 140 FIG. 14, fly wheel 142 rotates on a drive shaft of fly cutting machine 144. Cartridges 146A-146G (collectively cartridges 146) are removably secured into fly wheel 142. Fly wheel 142 is one example of a mounting structure that can receive tool shanks 147A-147G, e.g., secured into the removable cartridges 146. Each of cartridges 146 includes at least one of tool shanks 147 that includes at least one diamond tip for cutting features into a work piece. In this example, cartridges 146A, 146C and 146E define groove-cutting tips that are spaced laterally apart with respect to a rotational axis of fly wheel. Similarly, cartridges 146B, 146D and 146F define land-cutting tips that are spaced laterally apart with respect to a rotational axis of fly wheel.

The groove-cutting tips in cartridges 146A, 146C and 146E may be incrementally spaced to define three pitch-spaced grooves in a work piece, while the land-cutting tips in cartridges 146B, 146D and 146F are at one-half pitch spacing to define three land-spaced grooves in a work piece. Although illustrated as being in an alternating configuration, the groove-cutting tips and land-cutting tips may be positioned in other cartridges of flywheel. Also, although land-cutting tips in cartridges 146B, 146D and 146F are illustrated as being flat tips, these flat tips may also include a small sub-tip to define micro-groove sub-features in a land feature, e.g., as shown in diamond 130 of FIG. 13.

Figure 15:
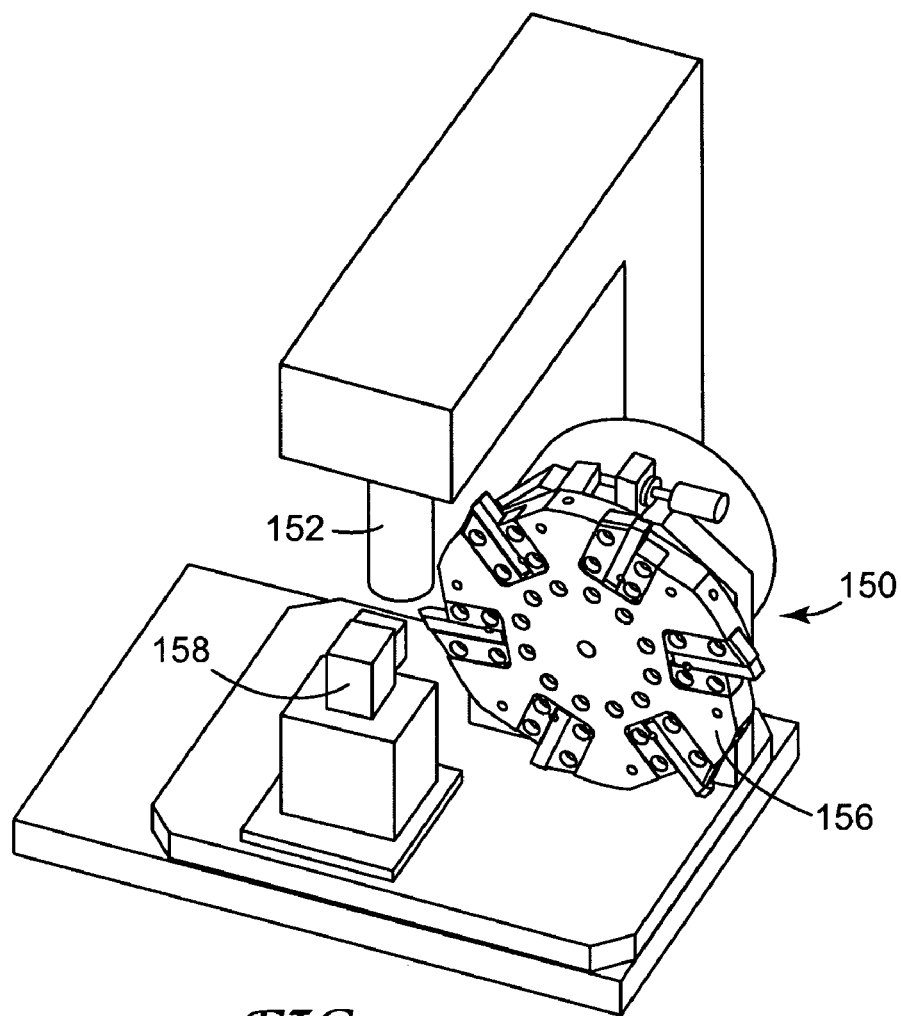
FIG. 15 is a perspective view of a fly-cutting tool being microscopically aligned.

FIG. 15 is a perspective view of a fly-cutting tool being microscopically aligned. In particular, in order to obtain diamond tip alignment to within the tolerances described herein, a microscope 152 may be used. While under microscope 152 the positions of the diamond tips of tool 150 can be adjusted to define precise pitch and one-half pitch spacing of the various cutting tips. Goniometer adjustment can be performed to ensure proper angular positioning of the fly wheel 156. In addition, an X-Y flexure device 158 may be used to ensure proper spatial positioning of the cutting tips within the various cartridges secured into fly wheel 156. Microscope 152 is used to ensure both angular and planar positioning of the cutting tips to within the tolerances described herein.

The center of rotation of the fly-cutting tool can be maintained by a locating sphere attached to the fly-cutting tool and receiver bores mounted in spindles of the fly-cutting tool. The receiver bores can be aligned to the axis of rotation of the spindles. Fly-cutting tool pilot balls may also be located along with the mating face of the fly-cutting tool to define the center of rotation of the fly-cutting tool. A fine motion rotation adjustment can be used to bring the fly-cutting tool into focus without moving the focus adjustment on the microscope stage. This removes any precision alignment and motion requirements from the focus stage of the microscope since that degree of freedom can be locked. Goniometer adjustment can be performed to ensure proper angular positioning of the fly wheel 156. The tip of the fly-cutting tool can be placed at the center of rotation to eliminate the translations that would be present otherwise. A precision X-Y flexure device 158 may be used to translate the cutting tools in two degrees of freedom relative to the rotor body without backlash.

For some cutting tools, the entire mastering process can be achieved without moving the microscope stage. When all the tool shanks are mounted in position, the microscope stage can be used to move the microscope objective out of the way and back into position so that the completed cutter can be fully inspected. When the cutting tips have been adjusted to the desired location and rotation, that position is locked in place by adhesive. A safety pin may be supplied in case the adhesive fails during subsequent cutting operations. If subsequent inspection finds one or more tips are not properly located, the out of specification cartridge and tool can be remove and replaced with a blank cartridge without disturbing the other tools.

Tapped holes may be provided to attach balance weights. In addition, tapped radial holes may be used to provide for fine balance adjustment set screws. Dummy cartridges can be used as counter weights if less than a full complement of six tools is loaded. The dummy cartridges may contain coarse balance adjustment screws. Due to the disc like design, dynamic balancing may not be required. A simple static balance between straightedges provides excellent balance results. A through hole can be used as a balance shaft.

Figure 16:
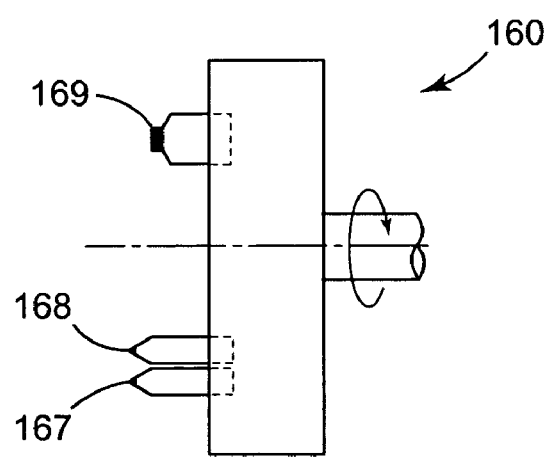
FIG. 16 is a tip view of an alternative embodiment of a fly-cutting tool according to the invention.

FIG. 16 is a tip view of an alternative embodiment of a fly-cutting tool 160 according to the invention. Like cutting tool assembly 10 of FIG. 1, cutting tool assembly 160 of FIG. 16 includes at least three diamond cutting surfaces, e.g., diamond tips 167, 168 and 169. Moreover, diamond tips 167 and 168 may be spaced to define one pitch, while diamond tip 169 is positioned at one-half pitch spacing with respect to diamond tips 167 and 168.

Unlike tool 10 of FIG. 1, however, a fly cutting tool 160 is configured such that a cutting location of diamond tips 167, 168 and 169 is parallel to a rotation axis 165 of fly cutting tool 160. In this case, diamond tips 167, 168 and 169 may form circular groove and land features in a work piece.

A number of embodiments have been described. In particular, a cutting tool assembly has been described that defines least two diamond cutting tips that correspond to grooves to be created in the microreplication tool and at least one diamond cutting tips that corresponds to a land feature to be created in the microreplication tool between the grooves. The invention is particularly useful in improving land feature creation by using a third diamond tip, rather than leaving the land features un-tooled and defined by the original un-tooled surface of micro-replication tool.

Nevertheless, various modifications may be made to the structure and techniques described herein without departing from the spirit and scope of the invention. For example, the cutting tool assembly may be used to cut grooves and lands into other types of work pieces, e.g., work pieces other than microreplication tools. Also, in other uses, two or more groove cutting diamonds may be secured in a tool shank as described herein, but secured with the cutting tips at different depths. In that case, the groove cutting diamonds may be spaced at integer pitch spacing and can be used to cut the same groove, e.g., with deeper and deeper cuts being made by different diamonds during subsequent passes of the tool. In this case, the land cutting diamond may still be used to create flat coplanar lands or lands with sub-features as described herein.

In still other cases, two land cutting diamonds may be used with one groove cutting diamond in a cutting tool. Also, for even more complex feature formation, the land cutting diamonds may be non-planar such that lands of different depths are created by a single cutting pass of the tool. Accordingly, other implementations and embodiments are within the scope of the following claims.

The invention claimed is:

1. A cutting tool assembly comprising:
    a mounting structure;
    a first tool shank mounted in the mounting structure, the first tool shank including a first diamond secured in the first tool shank, wherein the first diamond secured in the first tool shank defines a first diamond tip that corresponds to a first groove to be created in a work piece;
    a second tool shank mounted in the mounting structure, the second tool shank including a second diamond secured in the second tool shank, wherein the second diamond secured in the second tool shank defines a second diamond tip that corresponds to a second groove to be created in the work piece, wherein positions of the first and second diamond tips define an integer number of pitches between grooves to be created in the work piece; and
    a third tool shank mounted in the mounting structure between the first and second tool shanks, the third tool shank including a third diamond secured in the third tool shank, wherein the third diamond secured in the third tool shank defines a third diamond tip to create a land feature in the work piece between the first and second grooves.

2. The cutting tool assembly of claim 1, wherein a cutting location of the third diamond tip is positioned at integer pitch plus one-half pitch spacing relative to cutting locations of the first and second diamond tips.

3. The cutting tool assembly of claim 2, wherein spacing between the first and second tips is less than approximately 100 microns and the cutting location the third diamond tip is positioned less than 50 microns from the cutting locations the first and second diamond tips.

4. The cutting tool assembly of claim 1, wherein the third diamond tip defines a substantially flat cutting surface to define a flat land feature in the work piece.

5. The cutting tool assembly of claim 4, further comprising a fourth tool shank including a fourth diamond secured in the forth tool shank, wherein the fourth diamond defines a fourth diamond tip that defines a substantially flat cutting surface, wherein the third and fourth diamond tips define coplanar lands in the work piece.

6. The cutting tool assembly of claim 1, wherein the third diamond tip defines a non-flat cutting surface to define a non-flat land feature in the work piece.

7. The cutting tool assembly of claim 1, wherein the third diamond tip includes a flat portion and a sub-tip to define a land feature in the work piece that includes a micro-groove sub-feature in the land feature.

8. The cutting tool assembly of claim 1, wherein the cutting tool assembly is a flycutting assembly configured to be rotated about an axis perpendicular to a cutting direction of the diamond tips.

9. The cutting tool assembly of claim 1, wherein the work piece comprises a microreplication tool used in creating optical film, wherein the first and second diamond tips are shaped to create grooves in the microreplication tool that correspond to features to be created in the optical film and the third diamond tip is shaped to create a flat land feature in the microreplication tool.

10. The cutting tool assembly of claim 1, wherein the work piece comprises a microreplication tool used in creating optical film, wherein the first and second diamond tips are shaped to create grooves in the microreplication tool that correspond to features to be created in the optical film and the third diamond tip is shaped to create a non-flat land feature in the microreplication tool that corresponds to a different feature to be created in the optical film.

11. The cutting tool assembly of claim 1, wherein shapes of the first and second diamond tips are substantially similar, and a shape of the third diamond tip is substantially different than the shapes of the first and second diamond tips.

12. The cutting tool assembly of claim 1, wherein the first and second tool shanks are mounted to define the integer number of pitches to within a tolerance of less than approximately 10 microns.

13. A diamond tooling machine used for creating grooves in a microreplication tool, the diamond tooling machine comprising:
    a cutting tool assembly comprising:
    a mounting structure;
        a first tool shank mounted in the mounting structure, the first tool shank including a first diamond secured in the first tool shank, wherein the first diamond secured in the first tool shank defines a first diamond tip that corresponds to a first groove to be created in the microreplication tool;
        a second tool shank mounted in the mounting structure, the second tool shank including a second diamond secured in the second tool shank, wherein the second diamond secured in the second tool shank defines a second diamond tip that corresponds to a second groove to be created in the microreplication tool, wherein positions of the first and second diamond tips define an integer number of pitches of grooves to be created in the microreplication tool; and
        a third tool shank mounted in the mounting structure, the third tool shank including a third diamond secured in the third tool shank, wherein the third diamond secured in the third tool shank defines a third diamond tip to create a land feature in the microreplication tool between the first and second grooves; and
    an apparatus that receives the cutting tool assembly and controls positioning of the cutting tool assembly relative to the microreplication tool.

14. The diamond tooling machine of claim 13, wherein the machine is a fly-cutting machine that rotates the cutting tool assembly about an axis, and wherein the apparatus includes a drive train coupling the mounting structure to a motor.

15. The diamond tooling machine of claim 13, wherein the first and second diamond tips are shaped to create grooves in the microreplication tool that correspond to features to be created in the optical film and the third diamond tip is shaped to create a flat land feature in the microreplication tool.

16. The diamond tooling machine of claim 13, wherein the first and second diamond tips are shaped to create grooves in the microreplication tool that correspond to features to be created in the optical film and the third diamond tip is shaped to create a non-flat land feature in the microreplication tool that corresponds to a different feature to be created in the optical film.

17. A method comprising:

defining a pitch spacing for a microreplication tool;

creating a cutting tool assembly for creation of the microrelplication tool by:

positioning first and second tool shanks in a mounting structure such that a cutting location of a first diamond tip associated with a first diamond secured in the first tool shank is a defined distance from a cutting location of a second diamond tip associated with a second diamond secured in the second tool shank, the defined distance corresponding to an integer number of the pitch spacing, wherein the defined distance is accurate to within a tolerance of less than approximately 10 microns; and positioning a third tool shank in a mounting structure such that a cutting location of a third diamond tip associated with a third diamond secured in the third tool shank is between the cutting locations of the first and second diamond tips to create a land feature in the microreplication tool.

18. The method of claim 17, wherein positioning the third tool shank further comprises positioning the third diamond tip at integer pitch spacing plus one-half pitch spacing relative to both the first and second diamond tips to within a tolerance of less than approximately 10 microns.

19. The method of claim 17, further comprising:

creating the microreplication tool using the cutting tool assembly; and creating microreplicated structures using the microreplication tool.

20. A cutting tool assembly comprising:

a mounting structure;

a first tool shank mounted in the mounting structure, the first tool shank including a first diamond secured in the first tool shank, wherein the first diamond secured in the first tool shank defines a first diamond tip that corresponds to a groove to be created in a work piece; and a second tool shank mounted in the mounting structure, the second tool shank including a second diamond secured in the second tool shank, wherein the second diamond secured in the second tool shank defines a second diamond tip that corresponds to a land feature to be created in the work piece, wherein the second diamond tip is spaced at integer pitch spacing plus one-half pitch spacing relative to the first diamond tip, wherein a pitch refers to a distance between adjacent grooves created in the work piece, and wherein the integer pitch spacing plus one-half pitch spacing is accurate to within a tolerance of less than approximately 10 microns.

21. The cutting tool assembly of claim 20, farther comprising a third tool shank mounted in the mounting structure, the third tool shank including a third diamond secured in the third tool shank, wherein the third diamond secured in the third tool shank defines a third diamond tip that corresponds to a second groove to be created in a work piece, wherein the third diamond tip is spaced at an integer pitch relative to the first diamond tip and at an integer pitch plus one-half pitch relative to the second diamond tip.

22. The cutting tool assembly of claim 20, farther comprising a third tool shank mounted in the mounting structure, the third tool shank including a third diamond secured in the third tool shank, wherein the third diamond secured in the third tool shank defines a third diamond tip that corresponds to a second land to be created in a work piece, wherein the third diamond tip is spaced at an integer pitch relative to the second diamond tip and at an integer pitch plus one-half pitch relative to the first diamond tip.

* * * * *